US006472100B1

(12) United States Patent
Maruta

(10) Patent No.: US 6,472,100 B1
(45) Date of Patent: Oct. 29, 2002

(54) NONAQUEOUS-ELECTROLYTE BATTERY

(75) Inventor: Junichi Maruta, Kyoto (JP)

(73) Assignee: Japan Storage Battery Co., Ltd., Kyoto (JP)

( * ) Notice: Subject to any disclaimer, the term of this patent is extended or adjusted under 35 U.S.C. 154(b) by 0 days.

(21) Appl. No.: 09/442,241

(22) Filed: Nov. 17, 1999

(30) Foreign Application Priority Data

Nov. 17, 1998 (JP) ............................................ 10-327241

(51) Int. Cl.⁷ ............................ H01M 4/58; H01M 4/52
(52) U.S. Cl. ..................... 429/218.1; 429/223
(58) Field of Search ............................. 429/223, 231.3, 429/218.1, 310, 336, 339; 423/594; 252/182.1

(56) References Cited

U.S. PATENT DOCUMENTS 5,783,334 A * 7/1998 Yasuda ........................ 429/223
6,221,529 B1 * 4/2001 Yasuda ........................ 429/223
2001/0036577 A1 * 11/2001 Nakane et al. .............. 429/223

FOREIGN PATENT DOCUMENTS

JP           11111335    *  4/1999    .......... H01M/10/40

* cited by examiner

*Primary Examiner*—Stephen Kalafut
*Assistant Examiner*—R Alejandro
(74) *Attorney, Agent, or Firm*—Sughrue Mion, PLLC

(57) ABSTRACT

In a nonaqueous-electrolyte battery, a positive active material contains oxyhydroxide of nickel and aluminum. The positive active material may further contain oxyhydroxide of cobalt.

7 Claims, 2 Drawing Sheets

NONAQUEOUS-ELECTROLYTE BATTERY

BACKGROUND OF THE INVENTION

1. Field of the Invention

The present invention relates to a nonaqueous-electrolyte battery.

2. Description of the Related Art

In recent years, with the development of portable electronic apparatus, high performance batteries have been desired. A lithium ion battery, in which a carbon material is used in a negative electrode and lithium cobaltate in the form of lamellar composite oxide is used in a positive electrode, has been put in practical use as a nonaqueous-electrolyte battery having a high operating voltage and a high energy density. However, since lithium cobaltate is poor in natural resources and thus is expensive, lithium-containing manganese composite oxide or lithium nickelate has been proposed as a substitute. Such a composite oxide is an positive active material for so-called 4V lithium secondary battery which operates at around 4 V on the average.

On the other hand, since the development of ICIs operating at a voltage as low as not higher than 3 V is under way, or from the standpoint of battery safety, it is expected that the demand for 3V nonaqueous electrolyte secondary battery will be increasing. However, as an positive active material for 3V nonaqueous electrolyte secondary battery, there are generally Known only $LiMnO_2$ and $V_2O_5$. Even these substances are much disadvantageous in discharge capacity or cycle life and find extremely limited application such as memory backup.

Further, it has been recently reported that oxyhydroxide of nickel can be used as an positive active material for 3V nonaqueous electrolyte secondary battery (Lecture No. 3A06 at the 64th Conference of The Electrochemical Society of Japan). According to this report, oxyhydroxide of nickel, though having a theoretical discharge capacity of about 290 mAh/g, exhibits an initial discharge capacity as high as 285 mAh/g, which corresponds to a percent utilization of not less than 95%. Thus, it can be said that oxyhydroxide of nickel suffices for use requiring a high energy density battery such as power supply for note type personal computer.

However, oxyhydroxide of nickel is disadvantageous in that it doesn't have a good cycle life. The improvement in cycle life is a great assignment to be accomplished for practical use. It has thus been desired to solve this problem.

As mentioned above, oxyhydroxide of nickel is expected as an effective candidate for positive active material for 3V nonaqueous electrolyte secondary battery. Oxyhydroxide of nickel exhibits a very high level of initial discharge capacity but is disadvantageous in that it doesn't exhibit a good cycle life.

SUMMARY OF THE INVENTION

It is an object of the present invention to provide a nonaqueous secondary battery in which the cycle life is improved so that oxyhydroxide of nickel is practically used.

A nonaqueous-electrolyte battery according to the present invention comprises a positive active material containing oxyhydroxide of nickel and aluminum. In the nonaqueous-electrolyte battery according to the present invention, the positive active material may further contain oxyhydroxide of cobalt. Further, the nonaqueous-electrolyte battery according to the present invention may comprise an electrolyte containing heterocyclic compound containing nitrogen having lone pair as a constituent element of the heterocycle. The heterocyclic compound may be at least one selected from the group consisting of pyridine, pyrazine, pyridazine, pyrimidine, 1,3,5-triazine, 1,2,4,5-tetrazine, indolizine, quinoline, isoquinoline, cinnoline, 4H-quinolizine, quinazoline, quinoxaline, phthalazine, 1,8-naphthyridine, pteridine, acridine, phenazine, phenanthridine, 1,10-phenanthroline, benzo[c]cinnoline, 2,2'-piperidyl, benzo[g]quinoline, benzo[g]isoquinoline, benzo[h]quinoline, and benzo[f]quinoline.

DETAILED DESCRIPTION OF THE INVENTION

Figure 1:
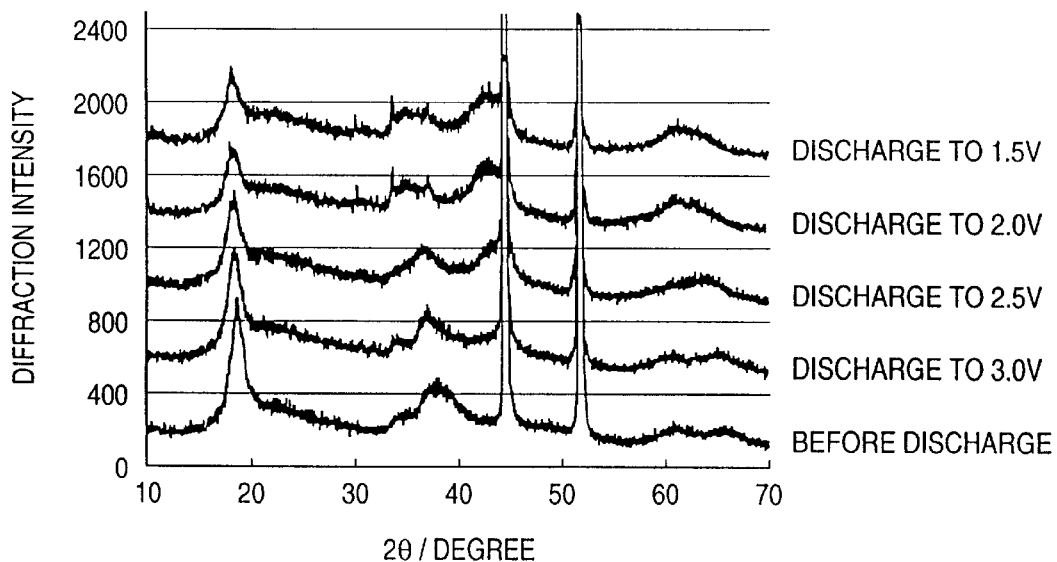
FIG. 1 illustrates the powder X-ray diffraction pattern (CuKα) of a positive active material containing oxyhydroxide of nickel and aluminum used in the battery A according to the present invention under various discharging conditions during discharge at the 1st cycle.

In a nonaqueous-electrolyte battery according to the present invention, a positive active material contains oxyhydroxide of nickel and aluminum rather than a conventional nonaqueous-electrolyte battery in which the positive active material merely contains oxyhydroxide of nickel. Thus, a nonaqueous-electrolyte battery having better charge-discharge cycle properties can be provided.

Incidentally, in the present invention, oxyhydroxide of nickel and aluminum is included in the positive active material by simply mixing nickel oxyhydroxide powder and aluminum oxyhydroxide powder therein. Alternatively, a compound including nickel element and aluminum element such as nickel-aluminum alloy and nickel-aluminum co-precipitation compound is changed to a oxyhydroxide compound thereof, and then, it is added to the positive active material.

In another embodiment, in the nonaqueous-electrolyte battery according to the present invention, the positive active material can further contain oxyhydroxide of cobalt to maintain good cycle properties even after deep discharge. That is, the positive active material contains oxyhydroxide of nickel, aluminum and cobalt. Also, in this embodiment, oxyhydroxide of nickel, aluminum and cobalt is included in the positive active material in the similar manner as described above embodiment.

The content of aluminum and cobalt in the positive active material is preferably such that the molar ratio (Al+Co)/(Ni+Al+Co) is not greater than 30%. This is because if the content of aluminum or cobalt exceeds 30% as calculated in terms of molar ratio, the discharge capacity drop increases.

In a further embodiment, the nonaqueous-electrolyte battery according to the present invention has an electrolyte containing heterocyclic compound containing nitrogen having a lone pair as a constituent element of the heterocycle to enhance the stability of oxyhydroxide of nickel particularly during charging and hence further improve the charge-discharge properties thereof.

The heterocyclic compound employable herein is at least one preferably selected from the group consisting of pyridine, pyrazine, pyridazine, pyrimidine, 1,3,5-triazine, 1,2,4,5-tetrazine, indolizine, quinoline, isoquinoline, cinnoline, 4H-quinolizine, quinazoline, quinoxaline, phthaladine, 1,8-naphthyridine, pteridine, acridine, phenazine, phenanthridine, 1,10-phenanthroline, benzo[c] cinnoline, 2,2'-piperidyl, benzo[g]quinoline, benzo[g] isoquinoline, benzo[h]quinoline, and benzo[f]quinoline. A particularly preferred example of the heterocyclic compound employable herein is pyridine.

Examples of the solvent for electrolyte employable herein include mixture of ethylene carbonate and diethyl carbonate, polar solvent such as ethylene carbonate, propylene carbonate, dimethyl carbonate, diethyl carbonate, γ-butyrolactone, sulfolane, dimethyl sulfoxide, acetonitrile, dimethylformamide, dimethylacetamide, 1,2-dimethoxyethane, 1,2-diethoxyethane, tetrahydrofurane, 2-methyl tetrahydrofurane, dioxolane and methyl acetate, and mixture thereof.

As the salt to be incorporated in the electrolyte there may be used a lithium salt such as $LiPF_6$, $LiBF_4$, $LiAsF_6$, $LiClO_4$, LiSCN, LiI, $LiCF_3SO_3$, LiCl, LiBr and $LiCF_3CO_2$ or mixture thereof. The optimum concentration of the electrolyte may be predetermined by properly combining these solvents and salts.

As the electrolyte to be used herein there may be used a lithium-ionically conductive solid high molecular compound electrolyte membrane. In this case, the electrolyte to be incorporated in the high molecular compound and the electrolyte to be incorporated in the pores in the solid high molecular compound electrolyte membrane may differ in solution for solution or supporting salt.

As the negative active material, there may be used metallic lithium, alloy of lithium with Al, Si, Pb, Sn, Zn, Cd or the like, transition metal composite oxide such as $LiFe_2O_3$, transition metal oxide such as $WO_2$ and $MoO_2$, carbon-based material such as graphite and carbon, lithium nitride such as $Li_5(Li_3N)$, metallic lithium foil, or mixture thereof.

EXAMPLES

The present invention will be further described in the following preferred examples, but the present invention should not be construed as being limited thereto.

Example 1

A positive active material having a particle diameter of from 5 to 50 μm and containing oxyhydroxide of nickel and aluminum in which an aluminum content of 5% as calculated in terms of molar ratio Al/(Ni+Al), 5% by weight of acetylene black as an electrically-conducting material, and an n-methyl-2-pyrrolidone solution of a polyvinylidene difluoride (9% by weight as calculated in terms of solid content of polyvinylidene difluoride) as a binder were mixed in a dry room to make a paste. The paste thus prepared was applied to an aluminum net as a collector, and then dried at a temperature of 100° C. to prepare a positive electrode plate having a size of 15 mm×15 mm.

Figure 4:
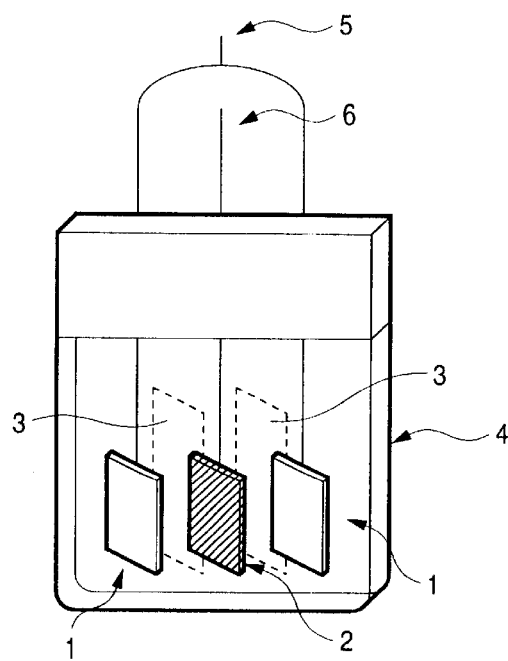
FIG. 4 is a schematic view of a nonaqueous-electrolyte battery produced in examples according to the present invention.

As shown in FIG. 4, two sheets of metallic lithium plates 1 having the same size as the positive electrode plate 2 were used for one sheet of the positive electrode plate. Two separators 3 were used, so that each separator 3 was interposed between the positive electrode plate 2 and the negative electrode plate 1. Graphite was used as a negative active material. In the negative electrode, a copper net was used as a collector. The separator was made of polyolefin. As an electrolyte, there was used 50 ml of a 1:1(by volume) mixture of ethylene carbonate and diethyl carbonate containing 1 M lithium perchlorate. These elements were housed and sealed in a battery case 4. The negative electrode plates 1 were connected to a negative terminal 5 and the positive electrode plate was connected to a positive terminal 6. Thus, a battery A according to the present invention was prepared.

Example 2

A battery B according to the present invention was prepared in the same manner as in Example 1 except that a positive active material containing oxyhydroxide of nickel and aluminum, in which an aluminum content of 15% as calculated in terms of molar ratio Al/(Ni+Al), was used.

Example 3

A battery C according to the present invention was prepared in the same manner as in Example 1 except that a positive active material containing oxyhydroxide of nickel and aluminum, in which an aluminum content of 30% as calculated in terms of molar ratio Al/(Ni+Al), was used.

Example 4

A battery D according to the present invention was prepared in the same manner as in Example 1 except that a positive active material containing oxyhydroxide of nickel, aluminum and cobalt, in which an aluminum content of 5% and a cobalt content of 5% as calculated in terms of molar ratios of Al/(Ni+Al+Co) and Co/(Ni+Al+Co), respectively, was used.

Example 5

A battery E according to the present invention was prepared in the same manner as in Example 1 except that a positive active material containing oxyhydroxide of nickel, aluminum and cobalt, in which an aluminum content of 20% and a cobalt content of 20% as calculated in terms of molar ratios of Al/(Ni+Al+Co) and Co/(Ni+Al+Co), respectively, was used.

Example 6

A battery F according to the present invention was prepared in the same manner as in Example 1 except that a positive active material containing oxyhydroxide of nickel and aluminum, in which an aluminum content of 5% as calculated in terms of molar ratio Al/(Ni+Al) was used, and an electrolyte contains pyridine incorporated therein in an amount of 0.4% by volume.

Example 7

A battery G according to the present invention was prepared in the same manner as in Example 1 except that a positive active material containing oxyhydroxide of nickel and aluminum, in which an aluminum content of 5% as calculated in terms of molar ratio Al/(Ni+Al) was used, and 100 ml of quinoline containing 1 M lithium perchlorate was used as an electrolyte.

Conventional Example 1

A conventional battery H was prepared in the same manner as in Example 1 except that a positive active material containing only oxyhydroxide of nickel was used.

Conventional Example 2

A conventional battery I was prepared in the same manner as in Example 1 except that a positive active material containing oxyhydroxide of nickel and cobalt, in which a cobalt content of 5% as calculated in terms of molar ratio Co/(Ni+Co), was used.

[Battery Evaluation Test]

The batteries thus obtained were each discharged to 3.0 V, 2.5 V, 2.0 V and 1.5 V with a constant current at a temperature of 25° C. and a current density of 0.5 mA/cm$^2$, and then charged to 4.2 V with a constant current at a current density of 0.5 mA/cm$^2$ and then with a constant voltage for 5 hours. This charge-discharge cycle was effected ten times in all.

structural change of oxyhydroxide of nickel during charge-discharge process.

Figure 2:
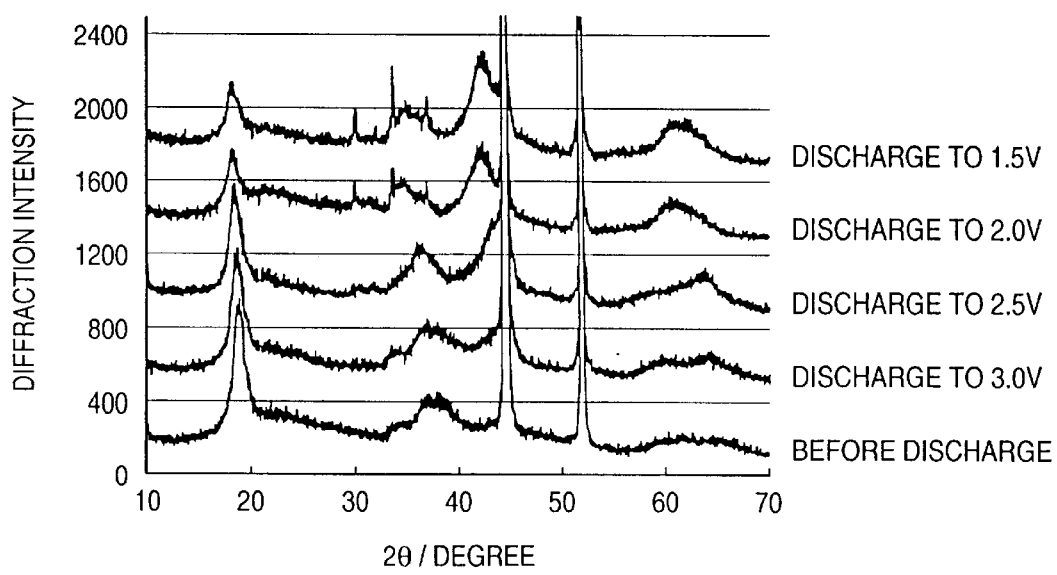
FIG. 2 illustrates the powder X-ray diffraction pattern (CuKα) of a positive active material containing oxyhydroxide of nickel used in a conventional battery H under various discharging conditions during discharge at the 1st cycle.

FIG. 1 illustrates the powder X-ray diffraction pattern (CuKα) of a positive active material containing oxyhydroxide of nickel and aluminum, in which an aluminum content of 5% as calculated in terms of molar ratio Al/(Ni+Al), used in the battery A according to the present invention under various discharging conditions during discharge at the 1st cycle. FIG. 2 illustrates the powder X-ray diffraction pattern (CuKα) of a positive active material containing oxyhydroxide of nickel used in a conventional battery H under various discharging conditions during discharge at the 1st cycle.

The comparison of the two samples shows that the positive active material containing oxyhydroxide of nickel and aluminum shows little or no change in X-ray diffraction pattern as the discharging depth varies while mere oxyhydroxide of nickel shows some change in X-ray diffraction pattern and hence in its structure as the discharging depth varies. This, too, demonstrates that the positive active material containing oxyhydroxide of nickel and aluminum is

TABLE 1

| Battery No.<br>Voltage at which discharge ends | A | B | C | D | E | F | G | H | I |
|---|---|---|---|---|---|---|---|---|---|
| 3.0 V | | | | | | | | | |
| Discharge capacity at 1st cycle (mAh/g) | 84 | 72 | 63 | 79 | 59 | 81 | 80 | 102 | 92 |
| Discharge capacity at 10th cycle (mAh/g) | 78 | 62 | 57 | 67 | 52 | 75 | 75 | 71 | 69 |
| % Capacity retention at 10th cycle | 92.9 | 86.1 | 90.5 | 84.8 | 88.1 | 92.6 | 93.8 | 69.6 | 75.0 |
| 2.5 V | | | | | | | | | |
| Discharge capacity at 1st cycle (mAh/g) | 166 | 153 | 141 | 157 | 133 | 160 | 157 | 184 | 177 |
| Discharge capacity at 10th cycle (mAh/g) | 142 | 131 | 126 | 142 | 111 | 146 | 145 | 97 | 91 |
| % Capacity retention at 10th cycle | 85.5 | 85.6 | 89.4 | 90.4 | 83.5 | 91.3 | 92.4 | 52.7 | 51.4 |
| 2.0 V | | | | | | | | | |
| Discharge capacity at 1st cycle (mAh/g) | 208 | 182 | 185 | 191 | 157 | 202 | 194 | 232 | 219 |
| Discharge capacity at 10th cycle (mAh/g) | 167 | 152 | 138 | 168 | 126 | 186 | 187 | 82 | 81 |
| Capacity retention at 10th cycle | 80.3 | 83.5 | 83.6 | 88.0 | 80.3 | 92.1 | 96.4 | 35.3 | 37.0 |
| 1.5 V | | | | | | | | | |
| Discharge capacity at 1st cycle (mAh/g) | 221 | 195 | 177 | 218 | 161 | 211 | 205 | 245 | 230 |
| Discharge capacity at 10th cycle (mAh/g) | 177 | 162 | 162 | 163 | 128 | 184 | 194 | 88 | 83 |
| % Capacity retention at 10th cycle | 80.1 | 83.1 | 91.5 | 83.9 | 79.5 | 87.2 | 94.6 | 35.9 | 36.1 |

Table 1 shows the discharge capacity of the various substances at the 1st cycle and the 10th cycle and the percent capacity retention with respect to the initial discharge capacity after the 10th cycle. The conventional batteries H and I exhibit a higher initial discharge capacity than the other batteries according to the present invention. However, after 10 cycles, the batteries A, B, C, D, E, F and G according to the present invention exhibit a higher percent capacity retention and hence a higher discharge capacity than the conventional batteries H and I.

This is presumably because the use of the positive active material containing oxyhydroxide of nickel and aluminum or the positive active material containing oxyhydroxide of nickel, aluminum and cobalt makes it possible to inhibit the more insusceptible to structural change during charge-discharge process than mere oxyhydroxide of nickel.

Figure 3:
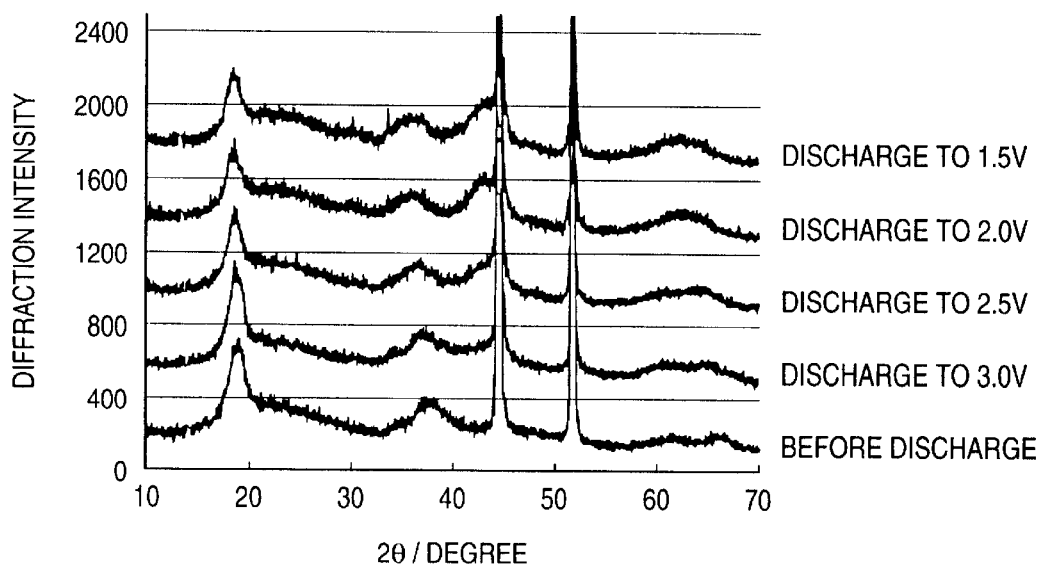
FIG. 3 illustrates the powder X-ray diffraction pattern (CuKα) of a positive active material containing oxyhydroxide of nickel, aluminum and cobalt used in the battery D according to the present invention under various discharging conditions during discharge at the 1st cycle.

FIG. 3 illustrates the powder X-ray diffraction pattern (CuKα) of a positive active material containing oxyhydroxide of nickel, aluminum and cobalt, in which an aluminum content of 5% and a cobalt content of 5% as calculated in terms of molar ratios of Al/(Ni+Al+Co) and Co/(Ni+Al+Co), respectively, used in the battery D according to the present invention under various discharging conditions during discharge at the 1st cycle. It can be seen in FIG. 3 that this compound shows little or no change in X-ray diffraction pattern as the discharging depth varies as in FIG. 1.

It is thus made obvious that the positive active material containing oxyhydroxide of nickel, aluminum and cobalt, too, is insusceptible to structural change during charge-discharge process. Since the charge-discharge cycle properties of the positive active material containing oxyhydroxide of nickel and cobalt as in the battery I are not so different from that of the positive active material containing only oxyhydroxide of nickel as in the battery H, this effect of inhibiting the structural change can be said attributed to aluminum in particular. Accordingly, the positive active material containing oxyhydroxide of nickel and aluminum and foreign compounds other than oxyhydroxide of cobalt, too, can exert an effect of improving the charge-discharge cycle properties.

The reason why the positive active material containing oxyhydroxide of nickel, aluminum and cobalt is preferred to the positive active material containing oxyhydroxide of nickel and aluminum and foreign compounds is because an active material containing cobalt is essentially advantageous in that it undergoes uniform electrochemical reaction and the positive active material containing oxyhydroxide of nickel, aluminum and cobalt shows little or no change in its crystal structure with charge-discharge cycle and hence exhibits excellent charge-discharge cycle properties.

As in the batteries F and G according to the present invention, batteries comprising an electrolyte containing heterocyclic compound containing nitrogen having a lone pair as a constituent element of the heterocycle exhibit further improvements in cycle life as compared with those free of such a heterocyclic compound. This is presumably because such heterocyclic compound containing nitrogen having a lone pair as a constituent element of the heterocycle shows some mechanism that contributes to the stabilization of the structure of oxyhydroxide of nickel.

Thus, the combination of the use of oxyhydroxide of nickel and aluminum (oxyhydroxide of cobalt) as an positive active material and the incorporation of heterocyclic compound containing nitrogen having a lone pair as a constituent element of the heterocycle in an electrolyte makes it possible to obtain a battery having extremely excellent cycle life.

The comparison of the batteries F and G according to the present invention shows that the battery G including a heterocyclic compound containing nitrogen having a lone pair as a constituent element of the heterocycle incorporated therein in a greater amount than the battery F exhibits better cycle life than the battery F, demonstrating that the great the content of such a heterocyclic compound is thought to be effective for improving the charge-discharge cycle properties. However, since even the incorporation of an extremely small amount of such a heterocyclic compound provides an effect of improving the battery life, such a heterocyclic compound can be used as an additive to be incorporated in other multiple mixture of solvents for electrolyte.

Besides the foregoing examples, batteries prepared in the same manner from compounds selected from the group consisting of pyrazine, pyridazine, pyrimidine, 1,3,5-triazine, 1,2,4,5-tetrazine, indolizine, isoquinoline, cinnoline, 4H-quinolizine, quinazoline, quinoxaline, phthaladine, 1,8-naphthyridine, pteridine, acridine, phenazine, phenanthridine, 1,10-phenanthroline, benzo[c]cinnoline, 2,2'-piperidyl, benzo[g]quinoline, benzo[g]isoquinoline, benzo[h]quinoline, and benzo[f]quinoline as heterocyclic compounds containing nitrogen having a lone pair as a constituent element of the heterocycle exhibited excellent charge-discharge cycle properties.

The nonaqueous-electrolyte battery according to the present invention includes the positive active material containing oxyhydroxide of nickel and aluminum or the positive active material containing oxyhydroxide of nickel, aluminum and cobalt and an electrolyte containing heterocyclic compound containing nitrogen having lone pair as a constituent element of the heterocycle such as pyridine. In this arrangement, the nonaqueous-electrolyte battery according to the present invention is little liable to change in the crystal structure of oxyhydroxide of nickel during charge-discharge process and hence exhibits further improvements in charge-discharge cycle life.

This is presumably because the incorporation of aluminum makes it possible to inhibit the change in the crystal structure of oxyhydroxide of nickel and the heterocyclic compound containing nitrogen having a lone pair as a constituent element of the heterocycle show some mechanism that contributes to the stabilization of the structure of oxyhydroxide of nickel.

As mentioned above, the battery according to the present invention can accomplish the improvement in the cycle life of oxyhydroxide of nickel. Accordingly, a high performance nonaqueous-electrolyte battery having a high capacity and a prolonged life can be provided.

Therefore, the present invention has an extremely great industrial Value.

What is claimed is:

1. A nonaqueous-electrolyte battery comprising a positive active material containing an oxyhydroxide, wherein the oxyhydroxide contains both nickel and aluminum.

2. A nonaqueous-electrolyte battery comprising a positive active material containing an oxyhydroxide, wherein the oxyhydroxide contains (a) nickel, (b) aluminum, and (c) cobalt.

3. The nonaqueous-electrolyte battery according to claim 1, further comprising an electrolyte containing heterocyclic compound containing nitrogen having a lone pair as a constituent element of the heterocycle.

4. The nonaqueous-electrolyte battery according to claim 3, wherein said heterocyclic compound is at least one selected from the group consisting of pyridine, pyrazine, pyridazine, pyrimidine, 1,3,5-triazine, 1,2,4,5-tetrazine, indolizine, quinoline, isoquinoline, cinnoline, 4H-quinolizine, quinazoline, quinoxaline, phthaladine, 1,8-naphthyridine, pteridine, phenanthridine, 1,10-phenanthroline, benzo[c]cinnoline, 2,2'-piperidyl, benzo[g]quinoline, benzo[g]isoquinoline, benzo[h]quinoline, and benzo[f]quinoline.

5. The nonaqueous-electrolyte battery according to claim 3, wherein said heterocyclic compound is pyridine.

6. The nonaqueous-electrolyte battery according to claim 1, wherein a content of aluminum in the positive active material is not greater than 30% in a molar ratio of Al/(Ni+Al).

7. The nonaqueous-electrolyte battery according to claim 2, wherein a content of aluminum and cobalt in the positive active material is not greater than 30% in a molar ratio of (Al+Co) (Ni+Al+Co).

* * * * *